M. COFFIN.
Horse Hay Fork.
No. 70,527. Patented Nov. 5, 1867.
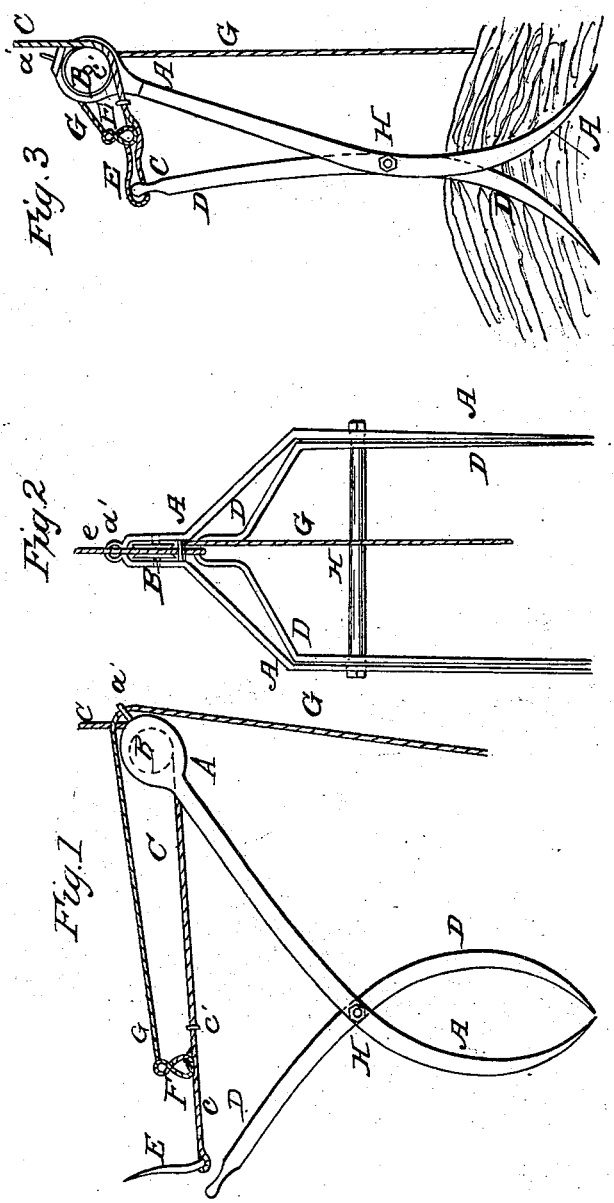

United States Patent Office.

MARK COFFIN, OF MILTON, KENTUCKY.

Letters Patent No. 70,527, dated November 5, 1867.

IMPROVEMENT IN HORSE HAY-FORKS.

*The Schedule referred to in these Letters Patent and making part of the same.*

TO ALL WHOM IT MAY CONCERN:

Be it known that I, MARK COFFIN, of Milton, in the county of Trimble, and State of Kentucky, have invented a new and useful Improvement in Horse Hay-Fork; and I do hereby declare that the following is a full, clear, and exact description thereof, which will enable those skilled in the art to make and use the same, reference being had to the accompanying drawings, forming part of this specification, in which—

Figure 1 is a side view of my improved fork in position for loading.

Figure 2 is a rear view of the same.

Figure 3 is a side view of the same loaded.

Similar letters of reference indicate corresponding parts.

My invention has for its object to furnish an improved horse hay-fork, simple in construction, easily operated, not liable to get out of order, and effective in operation; and it consists in the construction and combination of its various parts, as hereinafter more fully described.

A is a pair of curved tines, the upper ends of which incline towards each other, and have a pulley, B, placed between them, around which passes the rope C, by which the fork is suspended. D is another pair of curved tines, the upper ends of which incline towards each other, and have an eye or loop formed upon or attached to them at their point of meeting, for the passage of the hoisting-rope C. Each pair of tines may, if desired, be formed in one piece, as shown in the drawings, and their convex sides are pivoted to each other by a bar, H, passing through them, as shown in fig. 2, which said bar also forms a foot-rest for pressing the fork into the hay to load it. The rope C has a knot or stop, $c'$, formed upon or attached to it near its end, of such a size as to prevent the said rope from being drawn from the fork, and which supports the fork and load while being elevated and transported. E is the trigger-pin, which is attached to the end of the rope C, as shown in figs. 1 and 3. F is a ring, attached to the rope C, to receive the free end of the trigger-pin E, and hold the loaded fork locked. G is the trip-rope, the end of which is attached to the ring F, and which passes through an eye, $a'$, attached to the upper end of the tines A, and thence passes down into a convenient position to be reached by the operator to unload the fork.

In using the fork, the curved tines are brought into the position shown in fig. 1, and are then thrust down into the hay as far as desired. The upper ends of the tines are then drawn gradually together, while at the same time the fork is pressed downward with the foot. The end of the rope C is then passed through the eye at the upper end of the tines D, and the end of the trigger-pin E passed through the ring F, holding the fork locked until the ring F is withdrawn from the end of the trigger-pin E by operating the trip-rope G. The fork may be formed of two or more curved tines, as may be desired.

I claim as new, and desire to secure by Letters Patent—

The arrangement of the rope C, having the ring F, knot $c'$, and trigger E, with the bent tines A D, pulley-block B, and rope G, as herein described, for the purpose specified.

MARK COFFIN.

Witnesses:
GEORGE CHRISTMAN,
E. D. GILLEM.